UNITED STATES PATENT OFFICE.

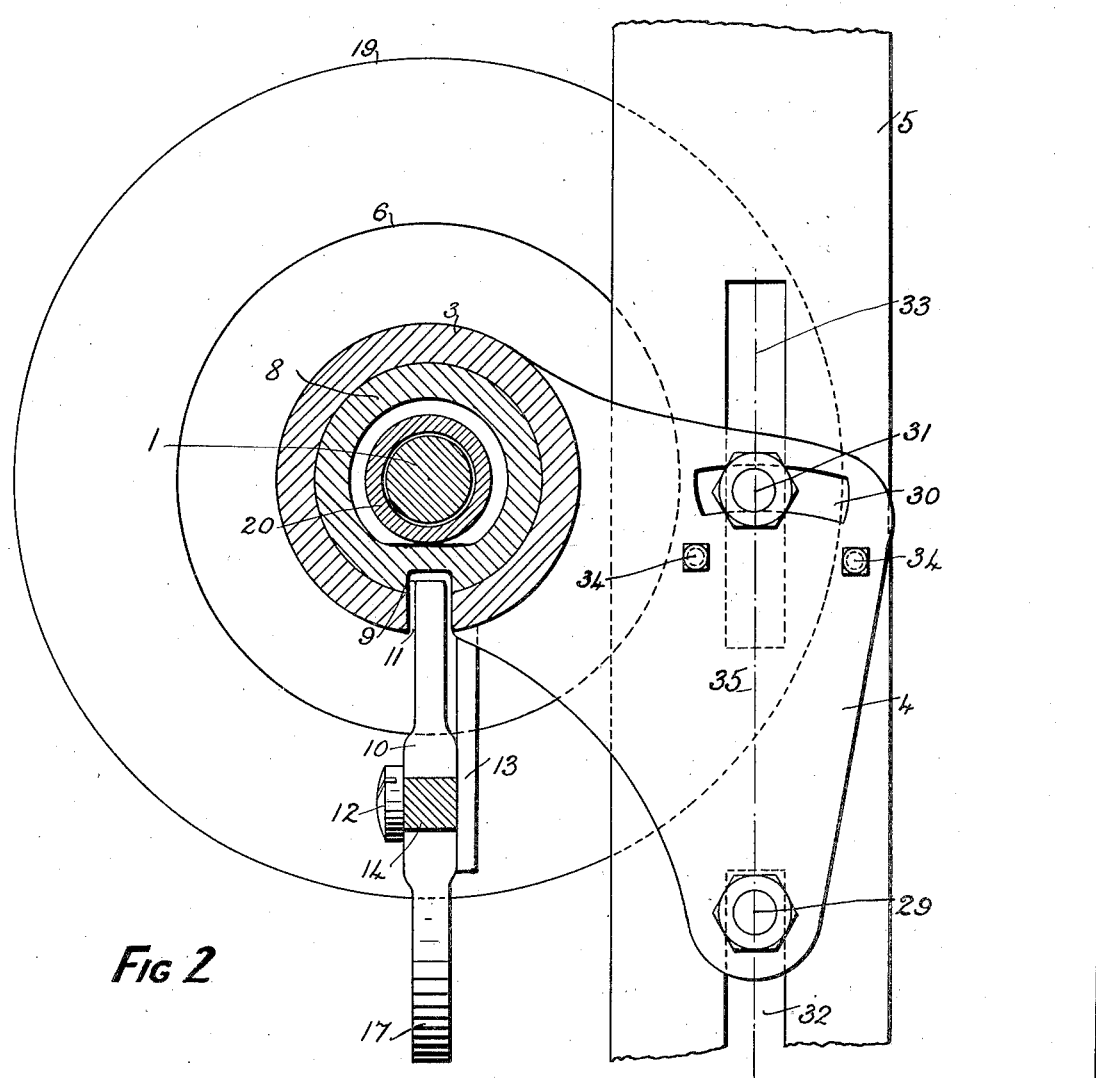

ARTHUR BEDWARD SPENCER AND FRANK EDWARD WALKER, OF HUCKNALL TORKARD, ENGLAND, ASSIGNORS OF ONE-THIRD TO GEORGE SPENCER, OF LUTTERWORTH, LEICESTERSHIRE, ENGLAND.

DRIVING MECHANISM FOR SEWING-MACHINES AND THE LIKE.

1,382,133.            Specification of Letters Patent.        Patented June 21, 1921.

Application filed March 27, 1920. Serial No. 369,179.

*To all whom it may concern:*

Be it known that we, ARTHUR BEDWARD SPENCER and FRANK EDWARD WALKER, both subjects of the King of Great Britain, residing at Hucknall Torkard, Nottinghamshire, England, have invented new and useful Improvements in or Relating to Driving Mechanism for Sewing-Machines and the like, of which the following is a specification.

This invention relates to driving mechanism for sewing machines and the like and is applicable especially though not exclusively, where a number of machines are arranged in series on a bench, stand or table and the source of power is electric.

The invention relates to the type of means employed for transmitting the drive from a running shaft to the machine or machines such means being under the control of the operator by a treadle or other suitable member. The present invention is an improvement in or modification of the invention described and claimed in our prior British specification No. 15232 of 1915 and has for its object an improved form of mechanism, advantageous features of which are compactness, cheaper production, easy accessibility for inspection of bearing, easy and very efficient lubrication, and a more balanced arrangement. Other features of improvement will be hereinafter referred to.

The invention consists, in a driving mechanism for the purpose described and comprising, in combination, a driving shaft, an outer bearing furnished with an inner (preferably ball) bearing supporting the driving shaft, a non-rotatable sleeve slidable in the outer bearing, a pulley rotatably carried (preferably on ball bearings) by the sleeve, a stationary braking surface on the outer bearing, a driving surface fixed to the driving shaft, and means consisting of a spring to effect movement of the sleeve in one direction and an operable lever or equivalent to move the sleeve in the other direction whereby the pulley is brought into contact with the braking surface and driving surface respectively, of an arrangement wherein the pulley is mounted on the inside of the sleeve and surrounding but independent and clear of the driving shaft.

The distinguishing feature is the mounting of the pulley on the inside of the slidable sleeve, which arrangement enables the mechanism to be made compact seeing that the portion of the pulley which is carried in the sleeve can be located within the part of the sleeve which is borne by the outer bearing, thus considerably reducing the amount of overhang of the pulley beyond the end of the supported part of the sleeve, in addition to which by bringing the points of support of the pulley within that part of the sleeve which is supported by the outer bearing a more balanced arrangement of mechanism is obtained.

It is also a feature of the invention that in combination with the improved arrangement already referred to, the spring which effects movement of the sleeve in one direction is arranged on the outside of the outer bearing and operates through the medium of the lever.

To enable the invention to be clearly and readily understood, a concrete embodiment of the same is shown in the accompanying drawing by way of example.

In the drawings:—

Fig. 2 is a cross-section taken through the body of same on the line *a—a* of Fig. 1 and viewed from the right.

Figure 1:
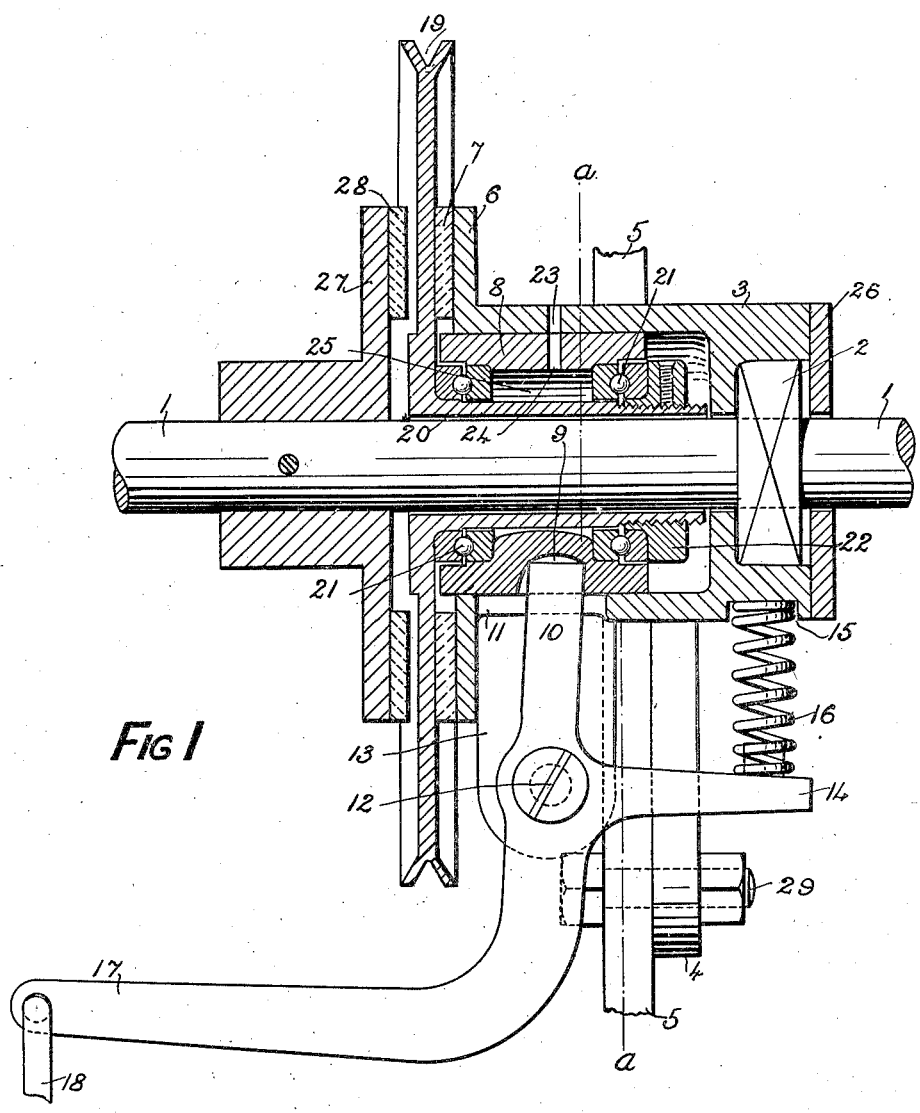
Figure 1 is a longitudinal sectional view of the improved driving mechanism.

In the concrete embodiment illustrated in the drawing the driving shaft 1 is supported by a ball bearing 2 of the self alining pattern carried in an outer bearing or casting 3 having formed therewith or attached thereto a bracket 4 adapted for attachment to the frame or standard 5 of the bench table or the like upon which the machine or machines is or are fixed. When a series of driving mechanisms are used upon the same driving shaft as is the case when a series of machines are arranged upon a common bench or table each machine being driven by a separate mechanism—the inner bearings 2 of the mechanism support the driving shaft 1 and an end thrust collar or bearing (not shown) may be used at a convenient locality. In the case of a single mechanism on the driving shaft, the latter may be supported by the inner bearing 2 and an end thrust bearing suitably fixed at a point remote from said inner bearing.

The outer bearing or casting 3 has formed thereon a flange 6 having fixed upon its face a ring 7 of leather or other material of appropriate character to constitute a braking surface.

Slidable in the outer bearing 3 is a sleeve 8 having formed in its underside a recess 9 into which fits the upper end of an actuating lever 10 this working through a slot or opening 11 formed in the outer bearing and engaging the sleeve to move the latter in either direction. The lever is pivoted at 12 on a lug 13 projecting from the bearing 3 and also has an integral arm 14 between the end of which and a recess 15 in the bearing 3 a spring 16 is arranged and serves to impart movement to the lever in one direction. Instead of the end of the spring being received in a recess such as 15 it may fit upon a boss formed on the outside of the bearing 3. The arrangement of the spring 16 on the outside of the mechanism as above described admits of easy renewal or removal of the spring without disturbing the other parts of the mechanism as it will, upon referring to Fig. 1, be manifest that by compressing the spring its ends may be disengaged from the parts which retain it whereupon it is free to be removed.

The lower end 17 of the lever 10 is suitably shaped and connected such as by a rod 18 with an actuating treadle situated underneath the bench as described and shown in the parent specification.

A belt pulley 19 has a long hollow boss 20 which extends through the before mentioned sleeve 8 and is rotatably supported therein by means of ball bearings of a type suitable for taking end thrust, as well as radial load. For this purpose a ball bearing such as 21 may be provided at each end of the sleeve as shown the pulley being kept in place by a locking collar 22 screwed and fastened upon the end of the boss 20.

The slidable sleeve 8 is prevented from rotating in the outer bearing 3 by the protrusion of the upper end of the lever 10 into the recess 9; alternatively the sleeve may have a groove (not shown) which is engaged by a key or pin in the outer bearing.

A very efficient lubrication of the pulley bearings 21 is rendered possible by means of a hole 23 formed through the top of the outer bearing 3, and a communicating hole 24 formed through the adjacent part of the sleeve 8 whereby the space 25 between the inside of the sleeve and the boss 20 of the pulley may be filled with lubricant. A suitable cap or stopper (not shown) may be used to close the oil hole 23 in the outer bearing. The end of the outer bearing 3 remote from the pulley is closed by means of a cover plate 26 so that this bearing is capable of retaining lubricant from the inner bearing 2 of the shaft 1.

The driving shaft 1 passes through the interior of the hollow pulley boss 20 so as to be clear and independent of same and has fixed to it a flanged boss 27 the flange having fastened to its face opposing the pulley a ring 28 of leather or other suitable material to constitute a frictional driving surface.

Between the rotating driving surface 28 and the stationary braking surface 7 there is a space slightly wider than the thickness of the pulley 19 and it will be understood that these surfaces are maintained at the proper distance apart by reason of the outer bearing 3 being fixed and the absence of endwise movement of the driving shaft 1.

The compression spring 16 acting upon the arm 14 of the lever 10 normally maintains the adjacent side of the pulley 19 against the braking surface 7. By a movement of the lever 10, the sleeve 8 is moved endwise in the outer bearing and shifts the pulley from the braking surface 7 and brings it into contact with the rotating driving surface, whereupon the pulley is caused to rotate on its bearings 21 within the stationary sleeve 8 and thus transmit the drive from the driving shaft 1 to the machine with which the pulley is connected by belt.

The actuation of the lever and sleeve takes place against the pressure of the spring 16, and when the treadle is released, the spring becomes active to move the lever in the opposite direction whereby the sleeve is moved to shift the pulley from the driving surface 28 and press it against the stationary brake surface 7. The pulley has sufficient play between the driving and braking surfaces to be clear of one when in contact with the other.

The bracket 4 which supports the outer bearing is preferably provided with a bolt hole at one end through which is passed a bolt 29 and at its opposite end it is furnished with a circumferential slot 30 through which is passed a bolt 31. These bolts 29 and 31 fasten the bracket to the side of the standard 5 the latter being slotted at 32, 33 to allow the device a certain amount of vertical adjustment. The circumferential slot 30 has as its center the bolt 29 so that the complete mechanism may be tipped or adjusted by turning the bracket on the bolt 29 as a pivot. The bracket may also be equipped with set screws 34 situated one on each side of the vertical center line 35 passing through the two bolts 29 and 31. The inner ends of these screws bear against the face of the standard 5 and may be used to hold the bracket 4 away from the standard to the degree required on either side of the center line 35 to set the outer bearing into alinement with the driving shaft. If desirable the outer bearing 3 may be attached to the bracket 4 in such a manner as to be capable of adjustment lengthwise thereon.

The invention is not to be confined to the use of a bracket of the specific form shown, as the attaching or mounting means of the mechanism may require to be modified in form to suit different types of benching or standards.

In the form of mechanism herein described it is an advantageous feature that the actuating lever 10 is carried by the outer bearing 3 seeing that any adjustment of said bearing in relation to the frame or standard of the bench does not in any way disturb said lever or its spring 16 and separate adjustment of these parts is obviated.

The mechanism herein described is easily accessible for inspection of bearings or any other purpose seeing that by unfastening the driving flange 27 and slipping same back along the shaft, and removing the lever 10, the sleeve 8 with the pulley 20 and bearings 21 therein may be slipped out of the outer bearing (in a left hand direction, Fig. 1) without disturbing the setting of the latter and be replaced just as readily by an opposite movement.

It will be observed that owing to the clearance between the boss 20 of the pulley and the shaft 1 there is no friction between the latter when it is running and the pulley is stationary. It will also be seen that the bearings of the pulley within the sleeve are located within the part of the outer bearing which carries the sleeve.

Claims—

1. A driving mechanism for the purpose described and comprising, in combination, a driving shaft, an outer bearing, an inner bearing therein supporting the driving shaft, a non-rotatable sleeve slidable in the outer bearing, a pulley mounted for rotation between said sleeve and shaft and clear of the latter, a stationary braking surface on the outer bearing, a driving surface fixed to the driving shaft, and means consisting of a spring to effect movement of the sleeve in one direction and an operable lever to move the sleeve in the other direction whereby the pulley is brought into contact with the braking surface and driving surface respectively.

2. In a driving mechanism for the purpose described and comprising, in combination, a driving shaft, an outer bearing, an inner bearing therein supporting the driving shaft, a non-rotatable sleeve slidable in the outer bearing, a pulley rotatably carried by the sleeve, a stationary braking surface on the outer bearing, a driving surface fixed to the driving shaft, and means consisting of a spring to effect movement of the sleeve in one direction and an operable lever to move the sleeve in the other direction whereby the pulley is brought into contact with the braking surface and driving surface respectively, an arrangement wherein the pulley is mounted on the inside of the sleeve and surrounding but independent and clear of the driving shaft, and the portion of the pulley which is carried in the sleeve is located within the part of the sleeve which is borne by the outer bearing, substantially as and for the purpose described.

3. In a driving mechanism for the purpose described and comprising, in combination, a driving shaft, an outer bearing, an inner bearing therein supporting the driving shaft, a non-rotatable sleeve slidable in the outer bearing, a pulley rotatably carried by the sleeve, a stationary braking surface on the outer bearing, a driving surface fixed to the driving shaft, and means consisting of a spring to effect movement of the sleeve in one direction and an operable lever to move the sleeve in the other direction whereby the pulley is brought into contact with the braking surface and driving surface respectively, a construction wherein the pulley is mounted on the inside of the sleeve and surrounding but independent and clear of the driving shaft, and the spring which effects movement of the sleeve in one direction is arranged on the outside of the outer bearing and operates through the medium of the actuating lever, substantially as and for the purpose described.

4. In a driving mechanism for the purpose described and comprising, in combination, a driving shaft, an outer bearing, an inner bearing therein supporting the driving shaft, a non-rotatable sleeve slidable in the outer bearing, a pulley rotatably carried by the outer sleeve, a stationary braking surface on the outer bearing, a driving surface fixed to the driving shaft, and means consisting of a spring to effect movement of the sleeve in one direction and an operable lever to move the sleeve in the other direction whereby the pulley is brought into contact with the braking surface and driving surface respectively, a construction wherein the pulley is mounted on the inside of the sleeve and surrounding but independent and clear of the driving shaft, and the actuating and controlling spring of the sleeve are carried by the outer bearing so as to be bodily adustable in company therewith, substantially as described.

5. A driving mechanism for the purpose described, comprising, in combination, a driving shaft, an outer bearing, a bracket thereon adapted to support said outer bearing in an adjustable manner, a ball bearing supporting the driving shaft within the outer bearing, a non-rotatable sleeve slidable in the outer bearing, a pulley rotatably carried by ball bearings on the inside of the sleeve and surrounding but being independent and clear of the driving shaft, a stationary braking surface on the outer bearing, a driving disk fixed to the driving shaft, a lever pivotally mounted on the exterior of the outer bearing and engaging the sleeve to move same in the said outer bearing whereby the pulley is brought into contact with the braking surface and driving surface respectively, and a spring arranged between said outer bearing and the lever to control the movement of the latter, substantially as described.

6. A driving mechanism for the purpose described, comprising, in combination, a driving shaft, an outer bearing, a bracket thereon adapted to support said outer bearing in an adjustable manner, a ball-bearing supporting the driving shaft within the outer bearing, a non-rotatable sleeve slidable in the outer bearing, a pulley, a boss on one side of said pulley, said boss extending within the sleeve and being rotatably supported therein by ball bearings and being located within the part of the sleeve which is borne by the outer bearing, said pulley and boss surrounding but being independent and clear of the driving shaft, a stationary braking surface on the outer bearing, a driving disk fixed to the driving shaft, a lug on the exterior of the outer bearing, a lever pivotally mounted on said lug and engaging the sleeve to move same in the outer bearing whereby the pulley is brought into contact with the braking surface and driving disk respectively, and a compression spring arranged between said outer bearing and an arm on the lever to control the movement of the latter, substantially as described.

In testimony whereof we have signed our names to this specification.

ARTHUR BEDWARD SPENCER.
FRANK EDWARD WALKER.